(12) United States Patent  
Viron

(10) Patent No.: US 6,227,841 B1  
(45) Date of Patent: May 8, 2001

(54) VALVE AND PINNED SCREW POINT ASSEMBLY

(75) Inventor: Alain Viron, Puiseaux (FR)

(73) Assignee: Nestal Machinery Ltd., Nafels (FR)

( * ) Notice: Subject to any disclaimer, the term of this patent is extended or adjusted under 35 U.S.C. 154(b) by 0 days.

(21) Appl. No.: 08/422,491

(22) Filed: Apr. 12, 1995

(30) Foreign Application Priority Data

Apr. 13, 1994 (FR) .................................................. 94 04488

(51) Int. Cl.$^7$ .................................................. B29C 45/52
(52) U.S. Cl. ........................................ 425/563; 425/382.4
(58) Field of Search ................................ 425/563, 382.4

(56) References Cited

U.S. PATENT DOCUMENTS 5,112,213 * 5/1992 Oas ....................................... 425/562

FOREIGN PATENT DOCUMENTS 2617977  10/1973 (DE) .
0212224   3/1987 (EP) .
1335824  10/1973 (GB) .

OTHER PUBLICATIONS

Patent Abstracts of Japan, vol. 10, No. 281 (M–520) (2337), Sep. 25, 1986, & JP–A–61 100 427 (Jiyuken Kogyo).
Patent Abstracts of Japan, vol. 11, No. 94 (m–574) (2541), Mar. 25, 1987, & JP–A–61 246 –031 (Japan Steel Works).

* cited by examiner

Primary Examiner—Tim Heitbrink
(74) Attorney, Agent, or Firm—Brinks Hofer Gilson & Lione

(57) ABSTRACT

An extruder assembly for an injecting moulding machine in which the screw point pin has a small diameter that can float and is self-centering. The pin has two support points or flats. The screw point and pin are used as a check valve in front of the piston screw of an injection molding machine for plastic materials. As a result of the small diameter of the pin the total output of plastified material is not diminished and there are no head losses. The screw point can be adapted to any models of injection molding machine, and its technical advantages give it high performance both in the field of what are known as "technical" molded parts and in the field of high-speed packaging.

12 Claims, 3 Drawing Sheets

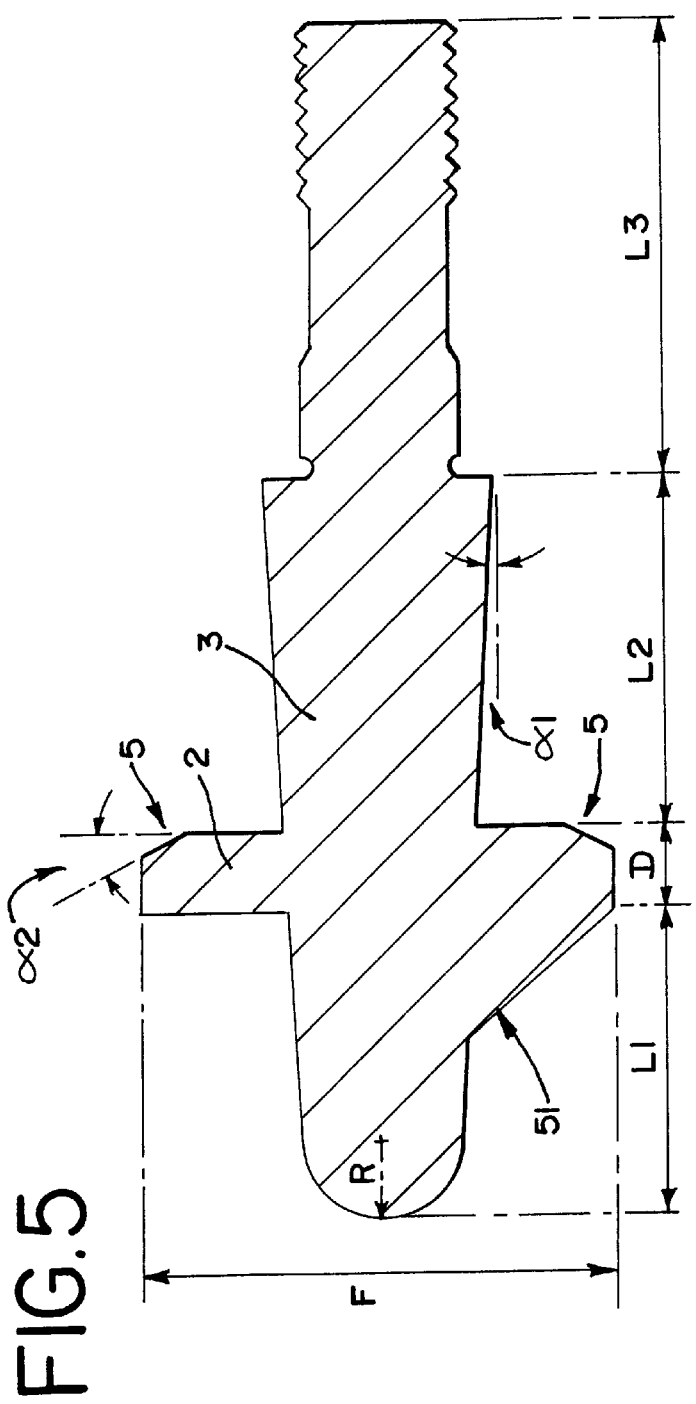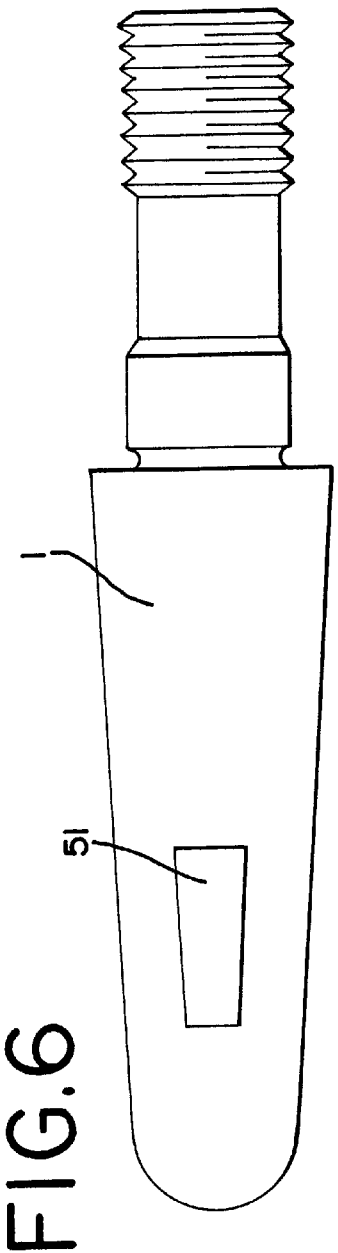

VALVE AND PINNED SCREW POINT ASSEMBLY

FIELD OF THE INVENTION

The present invention relates to an extruder assembly for an injection moulding machine comprising a valve and a pinned screw point.

BACKGROUND OF THE INVENTION

Extruder assemblies for injection moulding machines include piston screw that both reciprocate and rotate and includes a screw point at its leading end. The piston screw moves forward to inject melt and then retracts to take on new molten material to repeat the process.

Screw point that are currently being used generally have larger cross sections than screw points previously used. This increase results in an increase in the axial forces which are more difficult to overcome and also the response times are longer. This causes the material temperature to rise within the plasticizing screw, with attendant degradation of the material and losses in the injectable volume. The result of which is defects of the molded objects, which must then be rejected. In addition, the greater the axial forces, the higher the temperature will become and the greater the friction wear on the parts will be.

OBJECT OF THE INVENTION

The object of the invention is to limit the opening between the pressure ring of the injection molding machine and the valve, and to enable permanent recentering of the valve while reducing wear on the parts of the assembly.

This object is attained by an assembly comprising a screw point having a pin and a valve, that functions as a check valve located in front of the piston screw. This invention is characterized in that the pin includes only two support points located on its ends. These support points are formed as flats oriented at the angle that corresponds to the angle of the valve seat.

In another embodiment, the pin is cylindrical and non-floating in form, and is integral with the screw point.

In another embodiment, the pin is floating, self-centering and replaceable.

In another embodiment, the pin is not cylindrical.

In another embodiment, the pin has the form of a floating or non-floating fin.

Further characteristics and advantages of the present invention will become more apparent from the ensuing detailed description, in conjunction with the accompanying drawings.

BRIEF DESCRIPTION OF THE DRAWINGS

FIG. 5 is a sectional view of an embodiment of the pin that is integral with the screw; and FIG. 6 is a plan view, of an embodiment of the pin that is integral with the screw.

DESCRIPTION OF THE PREFERRED EMBODIMENTS

The self-centering, floating embodiment of the invention will be described with reference to FIGS. 1–3.

Figure 1:
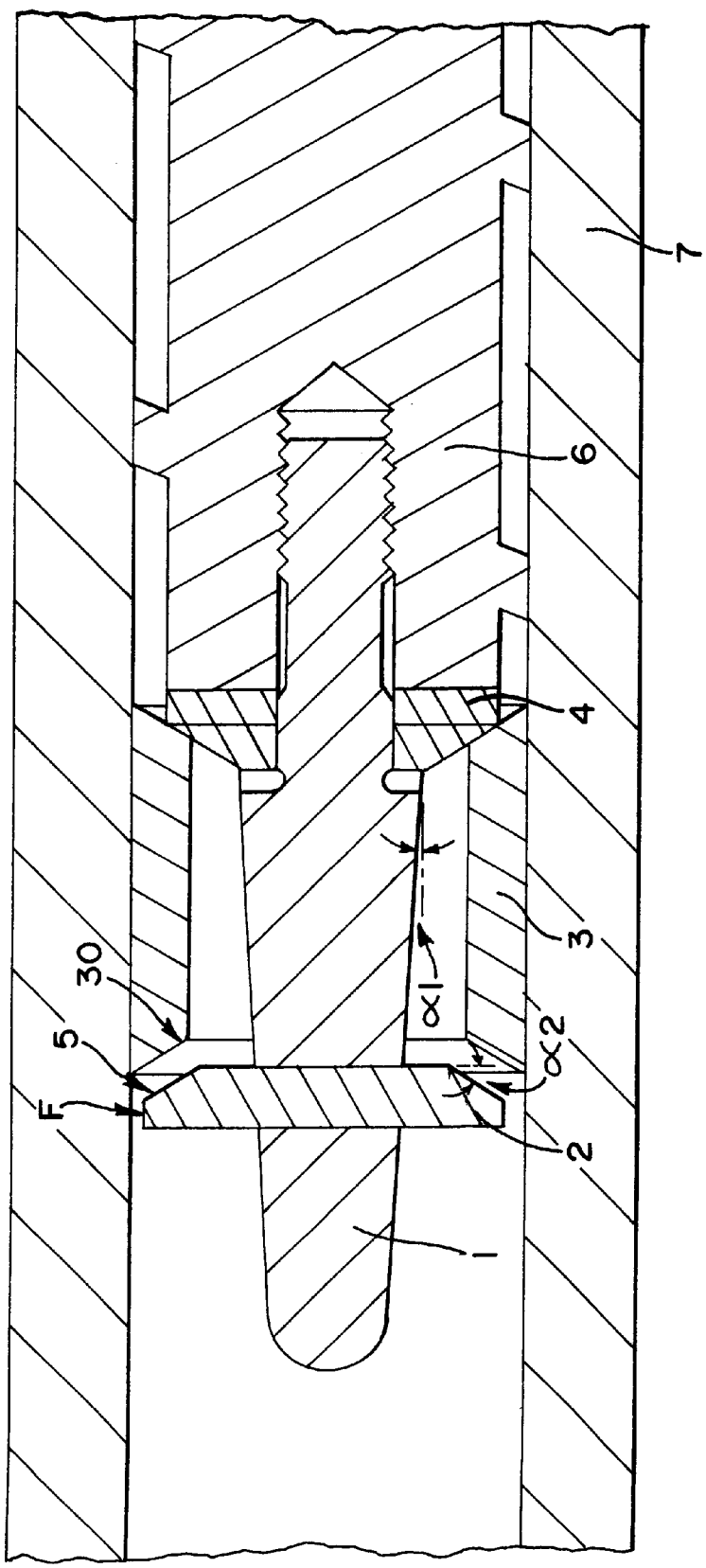
FIG. 1 is a sectional view of the assembly comprising the screw point, pin and valve in an injection cylinder.

FIG. 1 is a sectional view through the extruder assembly of an injection moulding machine comprising a screw point 1 mounted on the end of a plasticizer screw 6. The extruder assembly comprising the screw point 1 and plasticizer screw 6 that reciprocates and rotates inside the injection cylinder 7 of an injection molding machine. The injection moulding machine functions to feed molten materials. A pin 2 extends through a bore, extending normal to the longitudinal axis of screw point 1, formed in screw point 1.

A valve 3 is slidable within the injection cylinder and during the injection stage bears against pressure ring 4 that is carried on the end of the plasticizer screw 6. The screw point 1 has a generally conical shape defined by the conical angle $\alpha 1$. The screw point angle al is calculated such that when the flats 5 of pin 2 engage seats 30 the area of the opening defined by the valve 3 and the screw point 1, at pin 2, less the area of the pin 2, is equal to the area defined by the valve 3 and the screw point at the point where the diameter of the screw point is at its maximum. The cross sectional area of pin 2 is small relative the cross section area of the injection cylinder 7. Thus during the plasticizing stage these surface area are identical. This makes it possible to avoid head losses, or a reduction in the cross sectional area of the extruding head and to take into account the surface area occupied by the pin.

The pin 2 is mounted in the screw point 1 at a distance L2 from the end of the screw point adjacent to the pressure ring 4 such that during the stages when the valve 3 is open and the valve 3 is separated from the pressure ring 4, the pin 2 comes to rest on the valve 3 in such a way as to accomplish self-centering with the valve 3. This self-centering is achieved as a result of the flats 5 which are machined or forged at an angle $\alpha 2$. The angle $\alpha 2$ of the flats 5 is identical to the angle formed by the seat 30 of the valve 3. Thus, pin 2 can float relative to the screw point 1, as a result of the fact that at the operating temperature at which it is used it can slide within the cylindrical bore or otherwise-shaped receptacle provided for that purpose in the screw point. The screw point 1 and pin 2 can be constructed from materials such that when they are cold, ambient temperature, the pin is locked in the screw point 1, and the difference in expansion between the materials will assure that the pin will float, at the operating temperature.

In another embodiment shown in FIGS. 5 and 6, the pin may be cylindrical and formed integral with the screw point 1, as shown on the right side of FIG. 5, or may be in the form of a fin 51 formed integral with the screw point 1, as shown on the left side of FIG. 5. The fin 51 is also shown in FIG. 6. The flats 5, which are machined or forged at the angle $\alpha 2$, are required for the purpose of perfect recentering of the valve 3. These flats thus prevent blockage of the valve that would result from the fact that over time this valve 3 will wear and then will have play. When this occurs there is a tendency for the screw point 1 to assume a crosswise position, which would cause the plasticizer screw 6 to slide and would cause attendant irregularities in the dosage time and a lack of precision in the volume of the plastic material that is injected.

Because the pin 2 is of the floating type at the temperature of use, it allows simple interchangeability without specific tools. As a result the screw point 1 with the pin 2 provide important economic advantage.

The screw points of the prior art are considered to be wear parts, particularly for converters of glass-fiber- reinforced material that lack interchangeable elements. Moreover, the floating pin 2 reduces axial misalignments of the plasticizing screws 6 and reduces wear of the pin. The unique flats 5 of the pin 2 are machined or forged or provided with wear parts. For instance wear parts made of tungsten carbide or other material with wear-resistant properties, can be secured to the ends of pin 2. These flats are formed at a given angle α2 which enables not only recentering of the valve 3 and avoidance of blockage thereof but also self-centering of the pin 2 when the pin is of the floating type.

When pin 2 is not engaged with valve 3, valve 3 has a pressure equilibrium on each side. When the pin 2 comes to rest on the valve 3, the small cross section area of the flats 5 makes it possible to diminish the axial forces transmitted by the valve 3 to the flats 5. In fact, these axial forces are proportional to the internal pressure of the material and the pressure at the surface of the flats. Since these axial forces are slight, the temperature and wear from friction of the pin are diminished. Moreover, the slight difference in pressure that is exerted at the level of the valve, because of the small cross section of the flats, makes it possible to obtain incomparable performance in terms of the response time for closure of the valve 3 on the pressure ring 4, as compared to the prior art systems.

If the floating pin 2 were to be rotated, for example 180°, then when flats 5 and seat 30 attempt to engage the function of self centering would probably not occur. In this situation the equipment could also be damaged.

Figure 2:
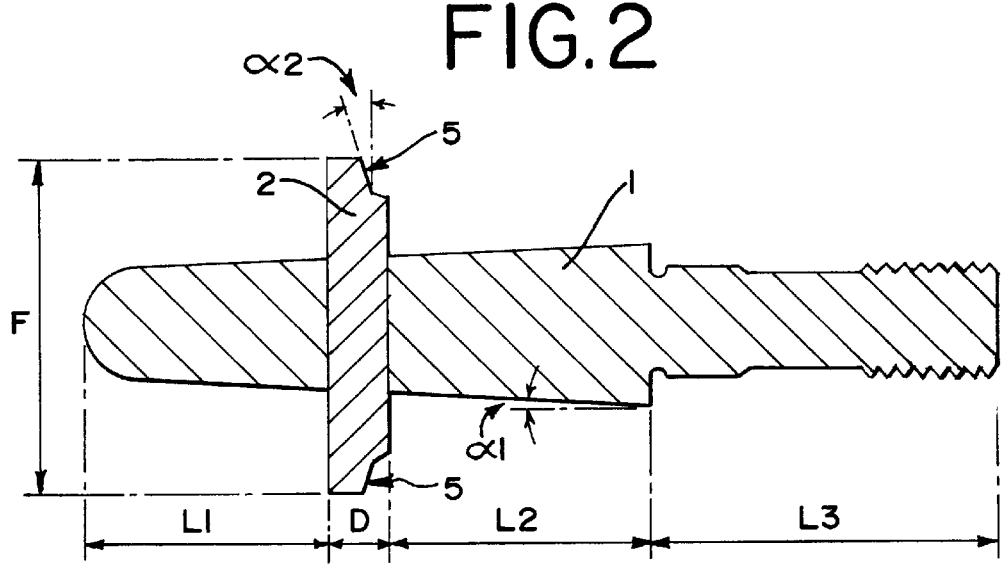
FIG. 2 is a sectional view of the screw point with a floating, self-centering pin according to the invention.
Figure 3:
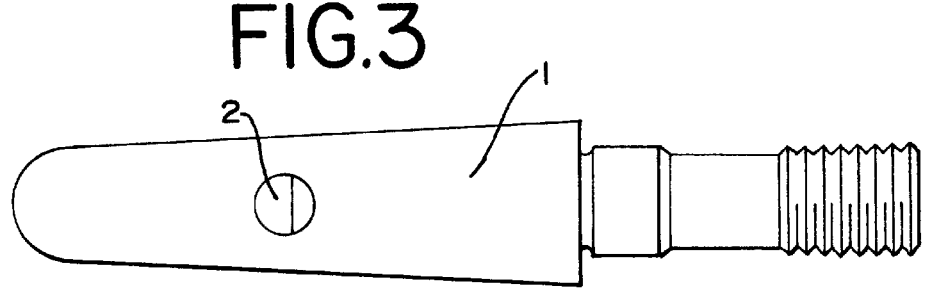
FIG. 3 is a plan view, of the screw point with a floating, self-centering pin according to the invention.
Figure 4:
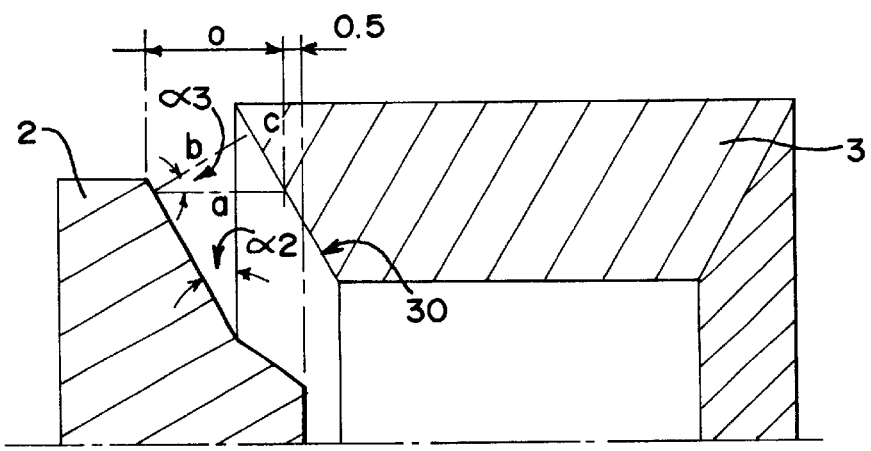
FIG. 4 shows details of the valve and of the self-centering pin.

FIGS. 2 and 4 show another embodiment, in which the structure of the pin and its location on the screw point 1, are calculated to minimize the possible rotation of this cylindrical floating pin 2 to less than one quarter of a turn. In FIG. 2 the distance L2 represents the distance from an edge of the pin in the screw 1 to the base of the cylindrical screw point. Distance L2 defines the spacing of the pin from the seat 30 of the valve when the valve is in the open position. The distance L2 is calculated on the basis that distance b is the distance separating the two parallel surfaces 30 of the valve 3 and the flat 5 of the floating pin 2 in such a way as to confine the cylindrical floating pin 2 to a rotation less than one quarter of a turn.

The distance b is calculated to determine the necessary opening in order not to cause head loss. Then the angle α3 is calculated by using the valve b to solve the following equations for angle α3: (a, b and c are the sides of the right triangle seen in FIG. 4)

$$(\tan \alpha 3) \times b = c$$

$$b^2 + c^2 = a^2$$

To the value thus obtained, a factor of safety, for example 0.5 mm is added, and the length L2 is then determined as a function of a and of the length of the valve 3. Since the distance between the flats 5 and the seat 30 will never exceed distance b the pin of diameter D will not be able to turn more than one quarter turn during operation of the machine.

In another embodiment, the rotation of the pin 2 is prevented by using a non-cylindrical pin, of square, oval, trapezoidal or rectangular cross section, or by simple wedging. However, the cylindrical form of the pin 2 lowers the risks of breakage of the materials fed in, thus reducing any alteration in the mechanical characteristics of the molded objects. The screw point with a fixed or floating pin according to the invention is also unique by its extreme simplicity, being made of only a few parts. Because of this, it guarantees a total output in proportion to the capacities of the various types of plasticizer screw, regardless of the viscosity of the starting material, thus offering a certain gain in productivity and overcoming the phenomena of self-heating of the converted material. The fact that the temperature of the plasticized composition is made uniform increases the molding precision and makes it possible to increase the production per hour.

The replaceability of the pin 2, which is within the competence of the user, adds to the economic value of this invention. This is true because the pin rather than the entire assembly can be replaced when worn.

The screw point according to the invention may be adapted to any models of injection molding machines, with its technical advantages giving it high performance whether in the field of what are known as "technical" molded parts or in the field of high-speed packaging that operate at a high hourly rates.

What is claimed:

1. In an extruder assembly for an injection molding machine comprising an injection cylinder, a piston screw and including a check valve in front of the piston screw that extends through the injection cylinder along a longitudinal axis and a screw point at the free end of the piston screw wherein:

said check valve includes a seat that is orientated at a given angle to said longitudinal axis;

said screw point includes a pin that extends therefrom in a direction normal to said longitudinal axis, said pin has a support point on each of its ends, said support points are formed by flats orientated at said given angle such that when said flats come into engagement with said seat said screw point is aligned about said longitudinal axis.

2. In an extruder assembly as set forth in claim 1 wherein:

said pin is cylindrical and in integral with said screw point.

3. In an extruder assembly as set forth in claim 1 wherein:

said pin is formed as a separate part from said screw point such that it can move relative to said screw point and is self-centering and replaceable.

4. In an extruder assembly as set forth in claim 1:

said pin has a non-cylindrical cross section.

5. In an extruder assembly as set forth in claim 1:

said pin is in the form of a floating fin.

6. In an extruder assembly as set forth in claim 1:

said pin is in the form of a non-floating fin.

7. In an extruder assembly as set forth in claim 1 wherein:

said injection cylinder having a given diameter;

said pin has a relative small cross section relative to said injection cylinder given diameter;

said screw point defines with said injection cylinder and seat a cross sectional area in the area of the pin;

said screw point is conically shaped according a conical angle and wherein the conical angle of said screw point is calculated to prevent a reduction in the cross sectional area of the extruding head in the area of said pin.

8. In an extruder assembly as set forth in claim 2 wherein:

said injection cylinder has a given diameter;

said pin has a relative small cross section relative to said injection cylinder given diameter;

said screw point defines with said injection cylinder and seat a cross sectional area in the area of the pin;

said screw point is conically shaped according a conical angle and wherein the conical of said screw point is calculated to prevent a reduction in the cross sectional area of the extruding head in the area of said pin.

9. In an extruder assembly as set forth in claim 3 wherein:

said injection cylinder has a given diameter;

said pin has a relative small cross section relative to said injection cylinder given diameter;

said screw point defines with said injection cylinder and seat a cross sectional area in the area of the pin;

said screw point is conically shaped according a conical angle and wherein the conical angle of said screw point is calculated to prevent a reduction in the cross sectional area of the extruding head in the area of said pin.

10. In an extruder assembly as set forth in claim 4 wherein:

said injection cylinder has a given diameter;

said pin has a relative small cross section relative to said injection cylinder given diameter;

said screw point defines with said injection cylinder and seat a cross sectional area in the area of the pin;

said screw point being in conically shaped according a conical angle and wherein the conical angle of said screw point is calculated to prevent a reduction in the cross sectional area of the extruding head in the area of said pin.

11. In an extruder assembly as set forth in claim 5 wherein:

said injection cylinder has a given diameter;

said pin has a relative small cross section relative to said injection cylinder given diameter;

said screw point defines with said injection cylinder and seat a cross sectional area in the area of the pin;

said screw point is conically shaped according a conical angle and wherein the conical angle of said screw point is calculated to prevent a reduction in the cross sectional area of the extruding head in the area of said pin.

12. In an extruder assembly as set forth in claim 6 wherein:

said injection cylinder has a given diameter;

said pin has a relative small cross section relative to said injection cylinder given diameter;

said screw point defines with said injection cylinder and seat a cross sectional area in the area of the pin;

said screw point is conically shaped according a conical angle and wherein the conical angle of said screw point is calculated to prevent a reduction in the cross sectional area of the extruding head in the area of said pin.

\* \* \* \* \*